(12) United States Patent
Haitsuka et al.

(10) Patent No.: US 6,366,298 B1
(45) Date of Patent: Apr. 2, 2002

(54) MONITORING OF INDIVIDUAL INTERNET USAGE

(75) Inventors: Stacy Haitsuka, Los Angeles; Ronald Burr, Agoura; Harold MacKenzie, Los Angeles; Marwan Zebian, Agoura; Terry Warren, Santa Ana; Shane Blaser, Moorpark, all of CA (US)

(73) Assignee: NetZero, Inc., Westlake Village, CA (US)

( * ) Notice: Subject to any disclaimer, the term of this patent is extended or adjusted under 35 U.S.C. 154(b) by 0 days.

(21) Appl. No.: 09/324,747

(22) Filed: Jun. 3, 1999

(51) Int. Cl.⁷ .................................. G06F 17/40

(52) U.S. Cl. ........................ 345/736; 345/854

(58) Field of Search ................... 345/346, 356, 345/357, 340, 127, 760, 752, 743, 736, 735, 772, 811, 804, 806, 854; 707/10; 348/348; 709/219

(56) References Cited

U.S. PATENT DOCUMENTS

| 5,347,632 A | 9/1994 | Filepp |
| 5,446,919 A | 8/1995 | Wilkins |
| 5,584,025 A | 12/1996 | Keithley |
| 5,717,860 A | 2/1998 | Graber |
| 5,717,923 A | 2/1998 | Dedrick |

(List continued on next page.)

FOREIGN PATENT DOCUMENTS

| CA | 2244002 | 7/1997 |
| CA | 2247325 | 9/1997 |
| CA | 2247330 | 11/1997 |
| EP | 823036 | 12/1997 |
| EP | 923036 | 12/1997 |
| EP | 0 822 535 A2 | 2/1998 |
| GB | 2328537 | 11/1997 |
| GB | 2328637 | 11/1997 |
| WO | WO97/27531 | 7/1997 |
| WO | WO 97/27531 | 7/1997 |
| WO | WO 97/21183 | 8/1997 |
| WO | WO 97/32257 | 9/1997 |
| WO | WO97/32257 | 9/1997 |
| WO | WO9740447 A1 | 10/1997 |
| WO | WO 97/40447 | 10/1997 |
| WO | WO9740514 A1 | 10/1997 |
| WO | WO 97/40601 | 10/1997 |
| WO | WO9740601 A1 | 10/1997 |
| WO | WO97/32258 | 11/1997 |
| WO | WO 97/32258 | 11/1997 |
| WO | WO 9741673 | 11/1997 |
| WO | WO97/43724 | 11/1997 |
| WO | WO 97/43724 | 11/1997 |
| WO | WO97/46946 | 12/1997 |
| WO | WO 97/46946 | 12/1997 |
| WO | WO98/13761 | 4/1998 |
| WO | WO 98/35300 | 8/1998 |
| WO | WO9835300 A1 | 8/1998 |
| WO | WO 00/30008 | 5/2000 |

OTHER PUBLICATIONS

Harty, Jeffrey D.; Aug. 31, 1999 letter addressed to Fred Randall re pending patent application filed by ASoftware.
Press Release: "dotNow! Free Internet Service Alerts More Competitors of Potential Patent Infringement".

*Primary Examiner*—Steven Sax
(74) *Attorney, Agent, or Firm*—Steven C. Sereboff

(57) ABSTRACT

Methods and apparatus for monitoring the on-line activities of an on-line user are disclosed. Information regarding the user's activities are used as a basis for targeting advertisements to the user. Monitoring is performed by a client monitoring application, which performs monitoring without intruding on the user's activities. In monitoring, URLs in the address bar of the browser application are obtained by the client monitoring application, or the stream of URLs transmitted by the browser application are obtained by the client monitoring application, or information in displayed web pages is obtained by the client monitoring application.

41 Claims, 8 Drawing Sheets

U.S. PATENT DOCUMENTS

| | | |
|---|---|---|
| 5,740,549 A | 4/1998 | Reilly |
| 5,761,662 A | 6/1998 | Dasan |
| 5,768,521 A | 6/1998 | Dedrick |
| 5,794,210 A | 8/1998 | Goldhaber |
| 5,809,242 A | 9/1998 | Shaw et al. |
| 5,838,790 A | 11/1998 | McAuliffe et al. |
| 5,933,811 A | 8/1999 | Angles |
| 5,946,646 A | 8/1999 | Schena |
| 5,948,061 A | 9/1999 | Merriman |
| 5,959,623 A | 9/1999 | Van Hoff |
| 6,035,332 A * | 3/2000 | Ingrassia, Jr. et al. ...... 709/224 |
| 6,052,730 A * | 4/2000 | Felciano et al. ............ 709/225 |
| 6,138,155 A * | 10/2000 | Davis et al. ................ 709/224 |
| 6,144,962 A * | 11/2000 | Weinberg et al. ............. 707/10 |
| 6,182,085 B1 * | 1/2001 | Eichstaedt et al. .......... 707/104 |

\* cited by examiner

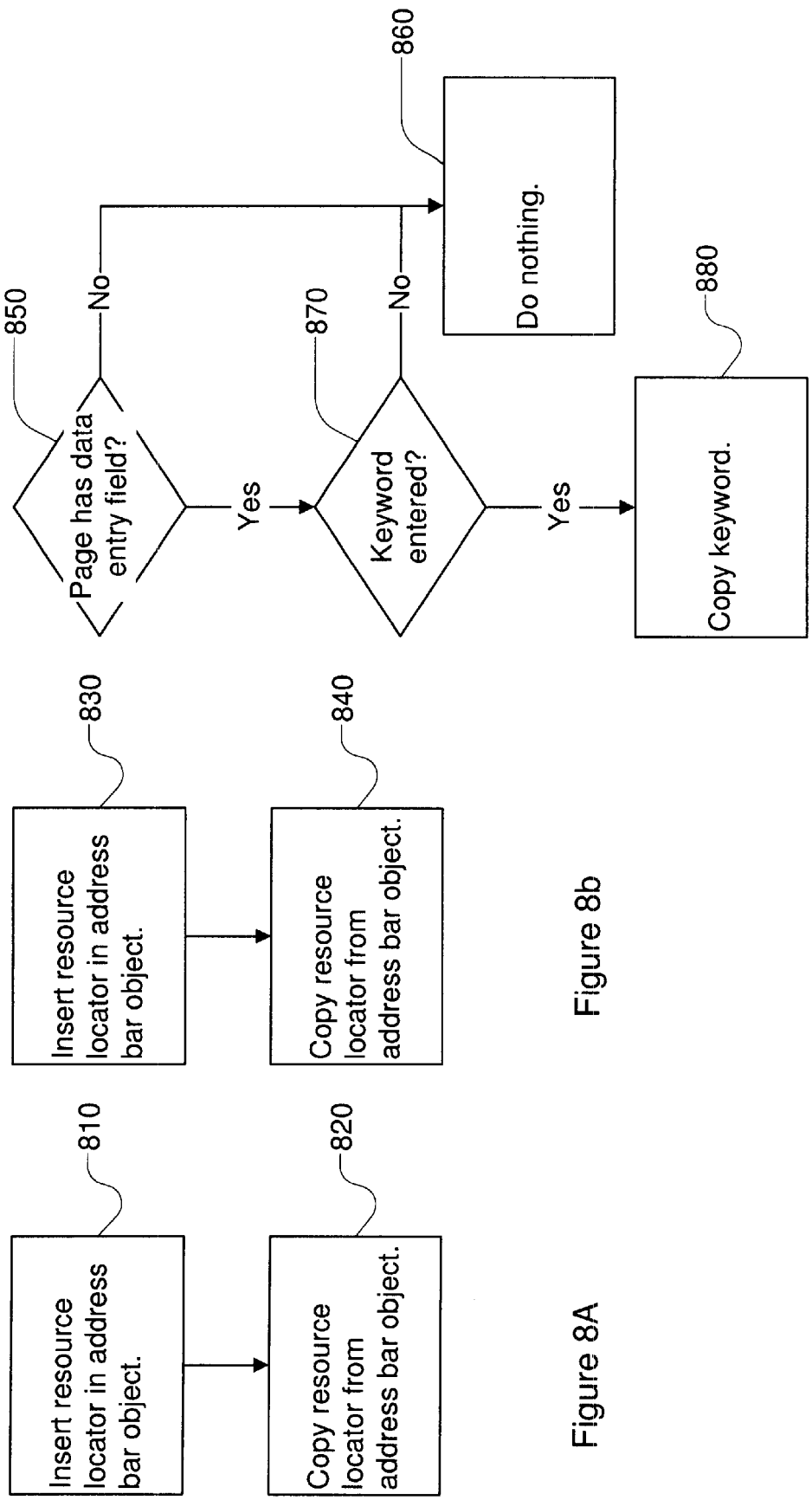

MONITORING OF INDIVIDUAL INTERNET USAGE

RELATED APPLICATION INFORMATION

This application is related to application Ser. No. 09/265,512 filed Mar. 9, 1999 entitled "Network Data Distribution Based Upon User-Specific Qualities," which is incorporated herein by reference, and which is a continuation-in-part of Application Ser. No. 60/077,331 filed Mar. 9, 1998 entitled "Network Data Distribution Based Upon Geographic Location, Usage Patterns, Interactive Data, Profile Data, Demographic Data and Scheduling Information."

This application is also related to application Ser. No. 09/349,325 filed Jul. 8, 1999 entitled "Monitoring of Individual Internet Usage."

BACKGROUND OF THE INVENTION

1. Field of the Invention

The present invention relates to monitoring the activity of a user of a data network, such as the Internet.

2. Description Of Related Art

Online services today offer a variety of services to their users. Users may access news, weather, financial, sports, and entertainment services, participate in and retrieve information from online discussion groups, and send and receive email. A user of an online service typically accesses the service using specialized communication software (i.e., client application or client software) that establishes and manages a connection from the user's computer (or client) to the service provider's host computers (or servers) and facilitates the user's interactions with the service.

In addition to managing the connection, there is provided software to display pages or screens relating to retrieved content according to views or presentations specific to the online service. This software may be integrated with the client application. The functionality of the content and the user interface (i.e., icons, dialog boxes, menus, etc.) for interacting with the content are typically dictated by various standards.

Interactions between the user's computer and the service are facilitated by a variety of software protocols (i.e., communication conventions, rules and structures), including application level protocols, for managing the transfer of data across the network and to the client application on the user's computer. A protocol may be proprietary or exclusive to a service such that only client software from the service provider may be used to communicate with the server software. For example, an online service that supports electronic mail, discussion groups, chat groups, news services, etc. may define and use specific protocols for each type of service so that appropriate information is exchanged between the participants (i.e., clients and servers). Each application-specific protocol may be based on a common, underlying protocol.

The Internet and World Wide Web ("Web"), comprised of a vast array of international computer networks, provide online service users with considerable information resources and other content. Typically, this content is accessed using a web browser, such as Microsoft Internet Explorer or Netscape Navigator, capable of understanding the HyperText Markup Language (HTML) used to create the documents found on the Web and the HyperText Transfer Protocol (HTTP) used to navigate the Web. Email and Usenet discussion groups are typically accessed through companion software to the browser. Although web browsers typically have varying levels of functionality or sophistication, retrieved content is displayed in content pages according to views or presentations specific to the web document currently presented by the web browser. Typically, the views and presentations are different than those provided by the communication software from the online service because the web browser is, in fact, a separate client application displaying web documents containing presentation directives.

When using a browser, the browser issues HTTP messages to request web pages. A requested web page is typically identified using its URL—uniform resource locator. The URL is a reference (or address) to a resource available on a TCP/IP network such as the Internet. A URL is composed of a character string, and may have a number of parts. These parts include a top level domain name, second level domain name, directory name, and file name. URLs may identify a file located on a web server. URLs may also point to other resources on the network such as database queries and command output. The determination and use of URLs is well known in the art and is not discussed further herein.

In some portions of this disclosure, the term "resource locator" is used. The term is defined as a string or code which uniquely identifies a resource on a network. Thus, the URL is a species of resource locator.

There are a number of ways that a user can connect to the Internet. First, a user can subscribe to a proprietary on-line network, such as, for example, America Online. Second, a user can subscribe to an Internet Service Provider (ISP). In any case, users typically connect to the Internet using a computer with a communications device such as an analog modem, an Ethernet adapter, DSL adapter or cable modem. Such connections may be analog or digital, dial-up or constantly-connected. Subscribers typically pay a fee for their subscriptions to proprietary non-line networks and ISPs. These fees typically are in the form of a sign-up fee, plus on-line charges which are fixed (i.e., unlimited monthly access for a fixed fee) or based upon the amount of time the user is connected. The fees generally increase with bandwidth.

On-line and Internet content and service providers often derive revenue by displaying advertisements to users. For example, when a user accesses a web page on the Web, an advertisement may be displayed to the user as part of the web page. Advertisements are also shown to users of some proprietary on-line services. Often in such systems, each user accessing a certain screen or site is shown the same advertisement. Sophisticated systems have the capability to change the advertisement after a certain period of time.

Advertisers find it desirable to target advertisements to relevant potential customers. For example, an advertiser of stockings would prefer to target women rather than men with its advertising. A Boston restaurant would prefer to target residents of Boston and business travelers rather than children living in San Francisco. Moreover, advertisers prefer to pay for advertising based upon the number of relevant consumers who are actually exposed to the advertisement. For typical on-line systems and networks, including the Web, it is often difficult for an advertiser to precisely determine whether its advertisements were actually viewed by a user and for how long, and whether the advertisement induced a response. Accordingly, there exists a need for a targeted advertisement system that also can provide information as to the characteristics of those who were exposed to each advertisement, for how long the user was exposed, and at what times.

SUMMARY OF THE INVENTION

In accordance with the present invention, the on-line activities of an on-line user are monitored and stored. Information regarding the user's activities are used as a basis for targeting advertisements to the user. Monitoring is performed by a client monitoring application, which performs monitoring without intruding on the user's activities.

According to one aspect of the invention, URLs in the address bar of the browser application are obtained by the client monitoring application. According to a second aspect of the invention, the stream of URLs transmitted by the browser application are obtained by the client monitoring application. According to a third aspect of the invention, information in displayed web pages is obtained by the client monitoring application.

Still further objects and advantages attaching to the system and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein:

FIGS. 8A, 8B and 8C are flow charts of several techniques for obtaining information about a requested web page in accordance with the invention.

These and additional embodiments of the invention may now be better understood by tuning to the following derailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.
The System of the Invention The system of the invention enables data to be sent to individuals based upon: the individual's geographic location; the individual's interactive data; the individual's network usage data; the individual's personal profile information; the scheduling requirements of the data to be sent; and the demographic requirements of the data to be sent.

Figure 1:
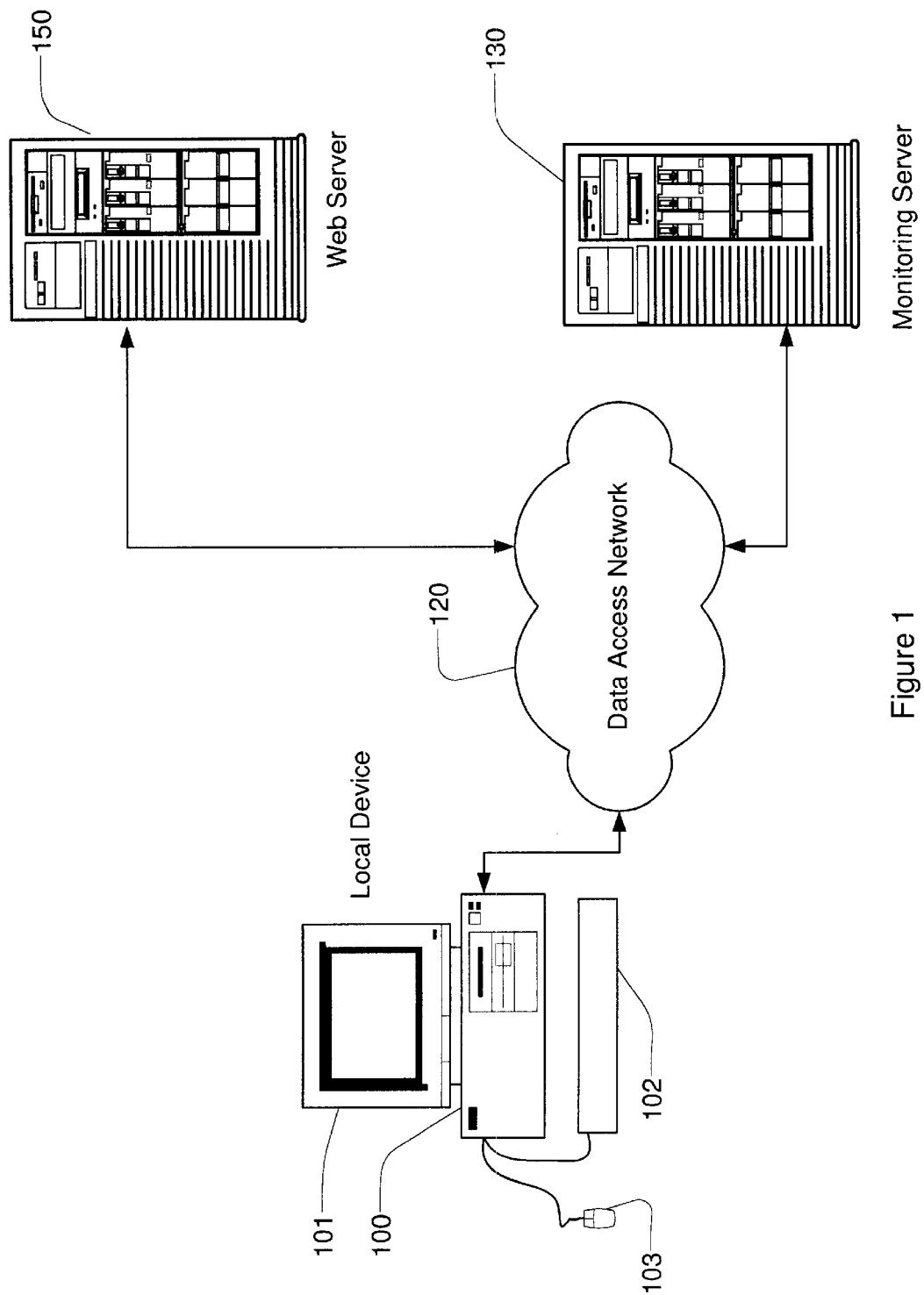
FIG. 1 is a first block diagram of a network data distribution system in accordance with the invention.

Referring now to FIG. 1, there is shown a block diagram of a network data distribution system in accordance with the invention in conjunction with a source of web pages. FIG. 1 includes a local device 100, a data access network 120, a monitoring server 130 and a web server 150. The local device 100, the data access network 120 and the monitoring server 130 comprise the network data distribution system.

The local device 100 preferably comprises a client computer which is configured to access the monitoring server 130 via the local access network 120. The client computer may be, for example, a PC running a Microsoft Windows operating system. The local device 100 preferably includes an output device, such as display 101, and an input device, such as keyboard 102 and / or pointing device 103 (e.g., mouse, track ball, light pen, or data glove). The local device 100 may also be, for example, an Internet appliance, network computer (NC), or an appropriately Internet-enabled device such as a portable digital assistant (PDA), mobile phone, refrigerator, etc. The particular type of device of the local device 100 is not considered to be important so long as the local device 100 can provide some measure of individual user interactivity with an online service.

The data access network 120 provides lower layer network support for the local device 100 to interact with the monitoring server 130 and the web server 150. The data access network 120 preferably comprises a common or private bi-directional telecommunications network (e.g., a public switched telephone network (PSTN), a cable-based telecommunication network, a LAN, a WAN, a wireless network), coupled with or overlayed by a TCP/IP network (e.g., the Internet or an intranet).

The web server 150 may be of the type known in the art and has the ability to serve web pages to the local device 100, as requested in the manner known in the art. It should be appreciated that the web server 150 is generic for any source of web pages available to the local device 100. Thus, for example, the web server 150 could be accessible from the Internet, or it could be a part of an intranet and represents any number of web servers.

The monitoring server 130 preferably is a computer system, such as a server computer. The monitoring server 130 acts as a recipient of certain information transmitted by the local device 100, as described further below. The monitoring server 130 preferably also transmits certain data to the local device 100 as described further below.

A browser application, such as Microsoft Internet Explorer or Netscape Navigator is preferably installed on the local device 100. A "browser application" is software which provides interactive utilization of hypertext objects located on a network, such as web pages on the Internet. When the local device 100 is connected to the web server 150 through the data access network 120, the user of the local device browses the web server 150 from the local device 100 using the browser application. The browser application itself need not be stored on the local device 100. The important aspect is that the user, from the local device 100, can exercise control over what web pages are requested and thus displayed by the local device 100.

Figure 2:
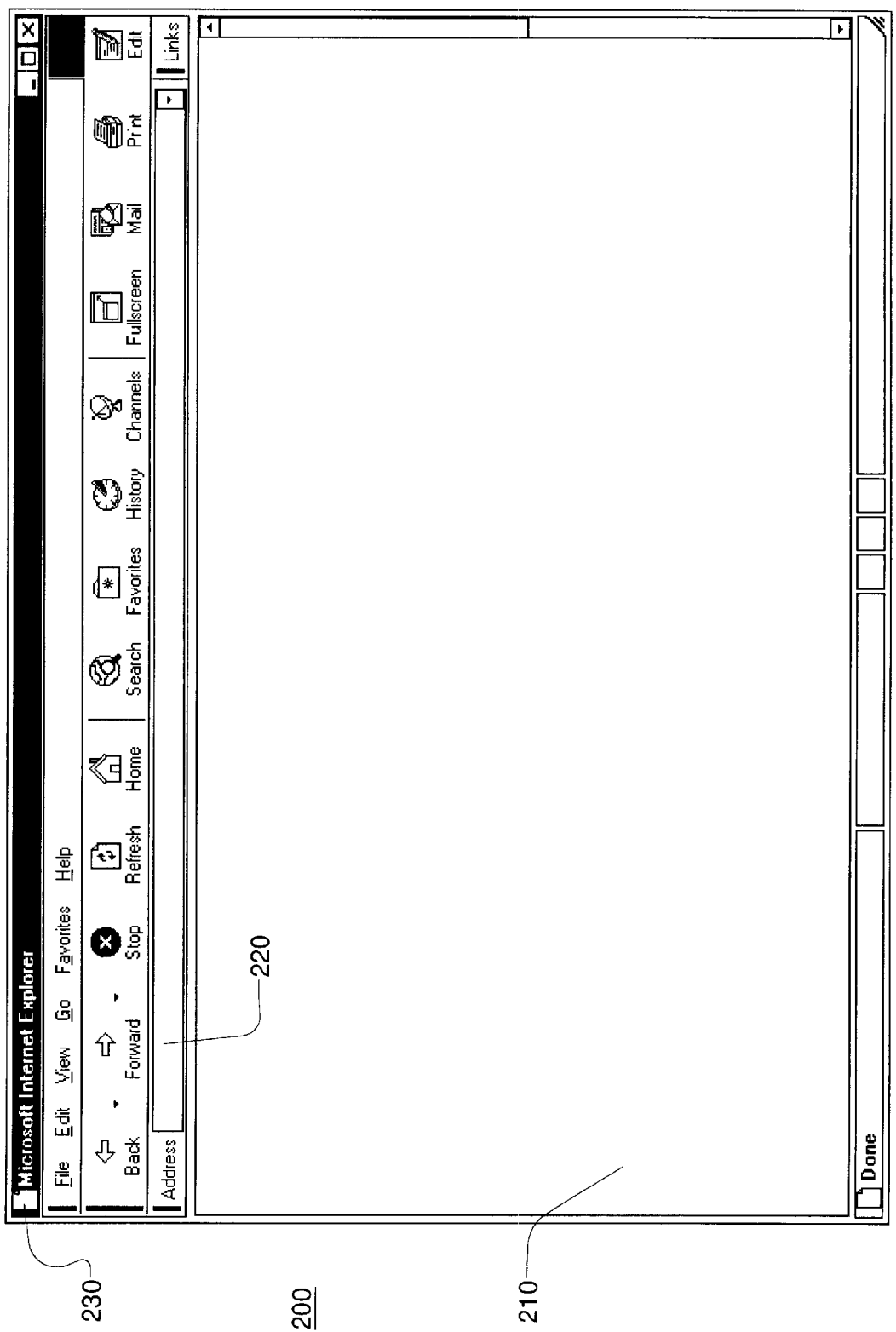
FIG. 2 is a screen shot of a window displayed by a browser application.

Referring now to FIG. 2, there is shown a window 400 generated by a browser application, here Microsoft Internet Explorer. The browser window 400 is familiar to those skilled in the art, so the particulars are not described further herein. Further information regarding the use of most browser applications and their technical specifications is abundantly available.

Several aspects of the browser window 400 are identified for further reference below. These aspects include a display pane 410, an address bar 420 and a title bar 430. The display pane 410 is a region of the browser window 400 wherein the browser application causes web pages received by the browser application to be displayed. The address bar 420 is another region of the browser window 400 and the browser application displays URLs in the address bar 420 corresponding to the web page currently displayed in the display pane 410. The user can also enter a URL into the address bar 420, and the browser application will attempt to load the web page or other object to which the entered URL points. The primary feature of the title bar 430 is that it displays the title of the browser application. Another feature of most browsers is that the title bar 430 displays the title of the web page then displayed in the display pane 410.

Some browser applications permit the address bar to be hidden. However, even if the address bar is hidden, the browser application will copy the URL of a requested web page into an object corresponding to the displayed address bar. For this reason, references herein to the term "address bar" refers either the address bar display 420 or the address bar object, depending on the context. One of skill in the art will appreciate the proper meaning of the term depending on its context. However, in general, the address bar display is indicated with its reference number, 420.

Figure 3:
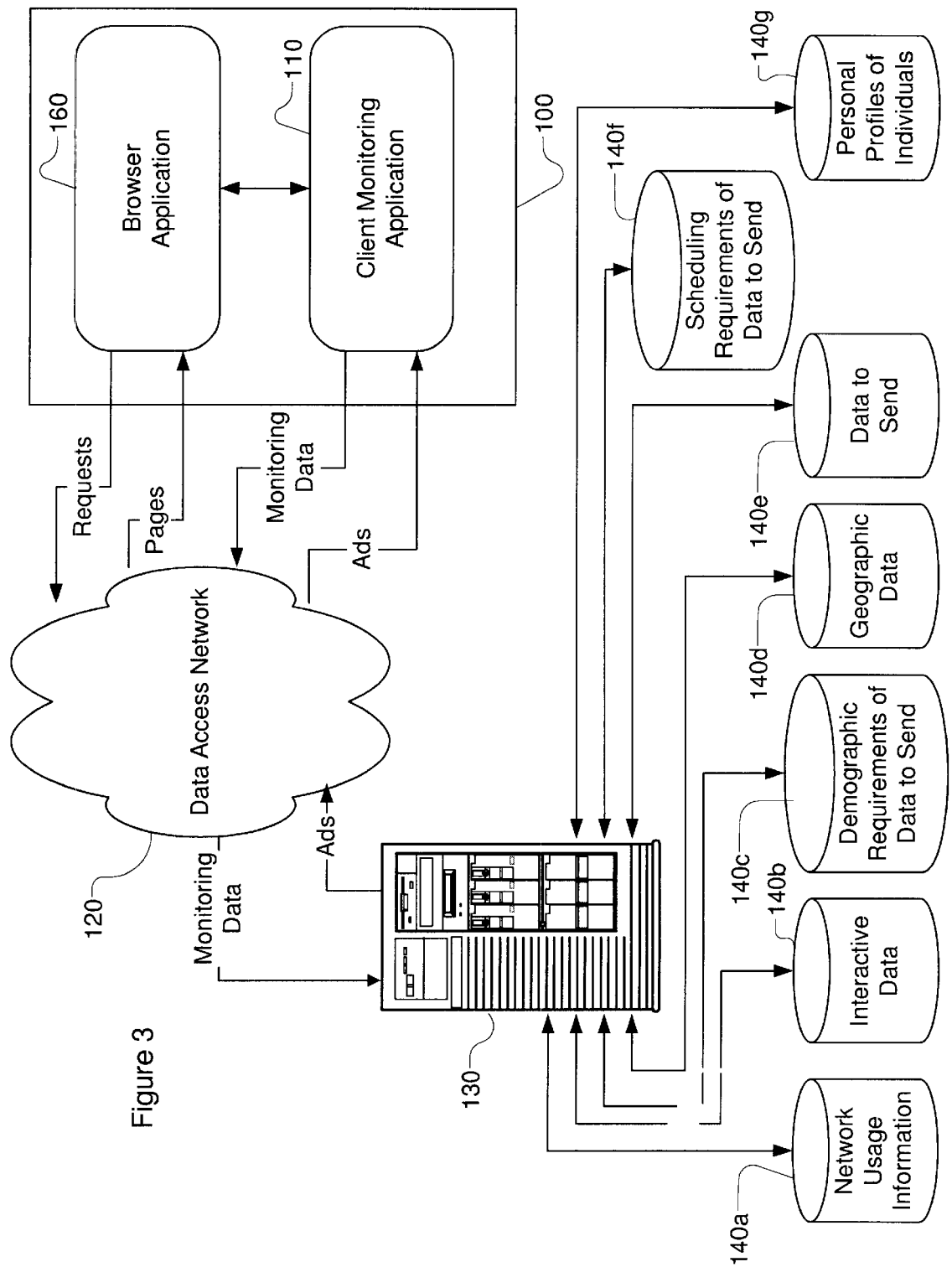
FIG. 3 is a second block diagram of a network data distribution system in accordance with the present invention.

Referring now to FIG. 3, there is shown a block diagram of a network data distribution system in accordance with the present invention. The system comprises a client monitoring application 110, the data access network 120, the monitoring server 130 and data stores 140*a–g* (collectively, 140). A browser application 160 is also shown. The client monitoring application 110 is a program operative on local device 100, and preferably an independent application program or a DLL. The client monitoring application 110 preferably retrieves certain network data, displays certain network data, transmits geographic location data, transmits interactive user data, transmits network usage data and transmits personal profile information as described below. The client monitoring application 110 is preferably a fully-featured client application which also sets up and maintains the connection to the data access network 120. The data stores 140 store and provide this geographic information data 140*d*, network usage data 140*a*, interactive usage data 140*b*, personal profile information 140*g*, data to be sent 140*e*, schedule for transmitting data 140*f* and demographics for transmitting data 140*c*.

Each time an individual uses the local device 100 to connect to the data access network 120, the client monitoring application 110 and the monitoring server establish a session. In this session, the client monitoring application 110 transmits certain information regarding the user of the local device 100 and his use of the local device 100 while connected to the data access network 120. The monitoring server 130, on the other hand, uses the information from the client monitoring application 100 to determine information which should be sent to the client monitoring application 110. Preferably, the information from the client monitoring application 110 is used by the monitoring server 130 to select advertisements to the local device 100. The client monitoring application then causes these advertisements to be displayed on the local device's output device 101.

The information from the client monitoring application 110 regarding the user preferably includes geographic data and personal profile information. Geographic data indicating the user's current location preferably is sent from the client monitoring application 110 to the monitoring server 130, which then stores the geographic data in the data store 140*d*. This geographic data can be something simple, like a phone number. The user preferably provides personal profile information on a periodic basis which is stored in the data store 140*g* and used by the monitoring server 130. This information consists of (but is not limited to) things such as: age, sex, marriage status, home address and personal interests.

The information regarding the user's use of the local device 100 includes email and web usage and advertisement click-throughs. The user's interactions and feedback with the web server 150 provided through the browser application 160 are preferably captured by the client monitoring application 110, analyzed by the monitoring server 130 and stored in the data store 140*b*. This includes the user's feedback and responses to the data delivered to the browser application 160. The user's activities on the web server 150 provided through the browser application 160 are preferably captured by the client monitoring application 110, analyzed by the monitoring server 130 and stored in the data store 140*a*. This includes the type of network data the user requests and accesses. This data is preferably summarized and classified into multiple demographic profiles.

The data to be sent to users preferably has scheduling requirements that dictate when it should be sent. These scheduling requirements may include, for example: frequency, maximum number of times to send to an individual, minimum number of times to send to an individual, time of day to send, and first and last days to send. The data to be sent to users can have demographic requirements that dictate to whom it should be sent. These include (but are not limited to): personal profile, interactive data, network usage information and geographic location.

The Methods of the Invention

Figure 4:
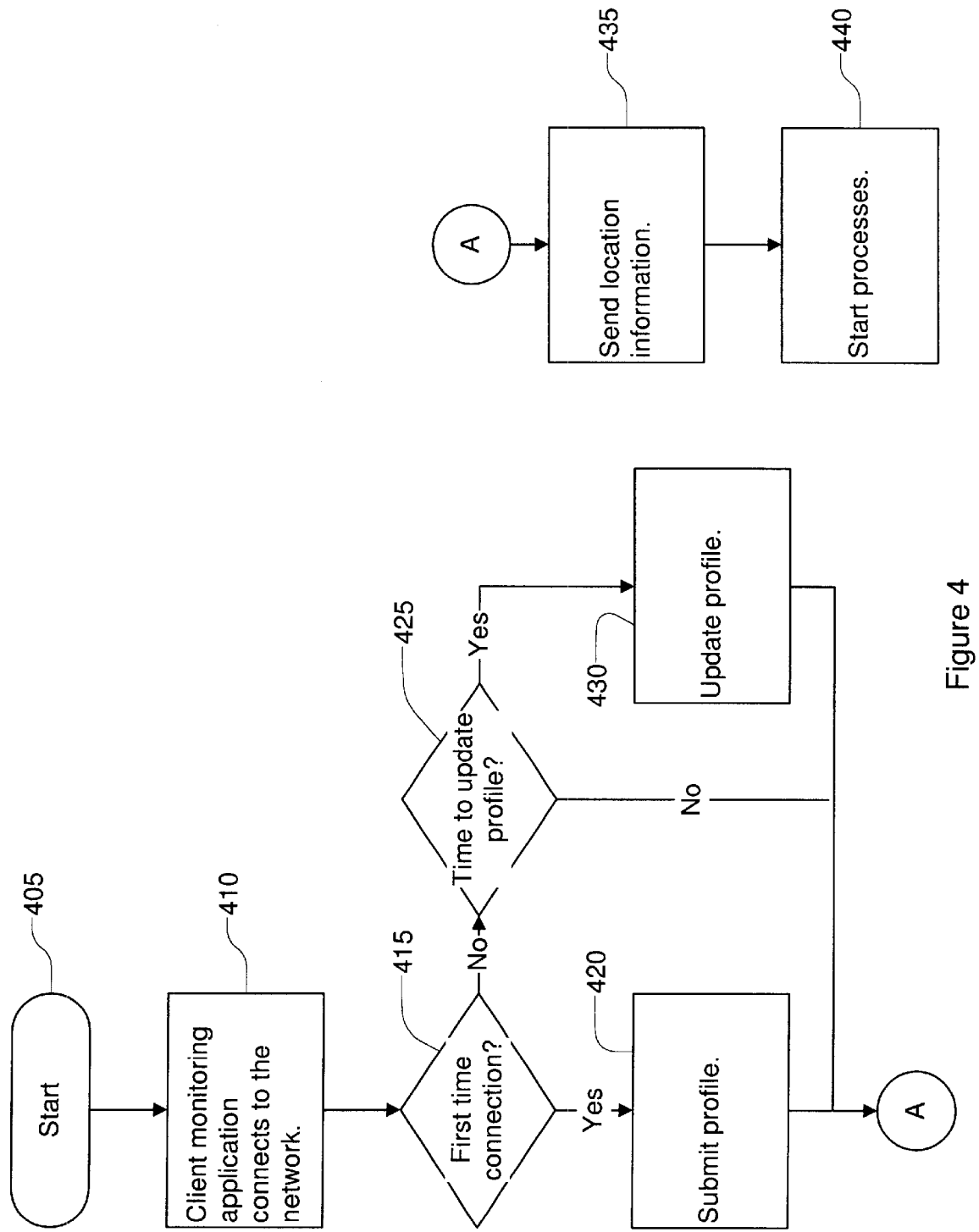
FIG. 4 is a flow chart of a method of distributing data in a network in accordance with the invention.

Referring now to FIG. 4, there is shown a flow chart of a method of distributing data in a network in accordance with the invention. The components 110, 120, 130, 140 work together to deliver data that meets the geographic and demographic criteria.

After the method begins (step 405), the user preferably uses the client monitoring application 110 to connect to the data access network 120, and then the monitoring server 130 (step 410). If this is the first time the user has connected (step 415), then the user is required to submit personal profile information (step 420). Preferably, the monitoring server 130 periodically will request (step 425) that the client monitoring application 110 have the user update this profile (step 430). Each time the local device 100 connects to the monitoring server 130, the client monitoring application 110 preferably sends data indicating the local device's current geographic location to the monitoring server 130 (step 435).

Once connected, a number of processes are started (step 440). In one of these processes, whenever the user interacts with data received on the client monitoring application 110, the client monitoring application 110 sends feedback information respecting this interaction to the monitoring server 120. The monitoring server 120 then summarizes and classifies the feedback information into multiple demographic profiles, and stores these profiles in the data store 140.

In another of these processes, whenever a user uses the browser application 160 to request or access data from the web server 150, the client monitoring application 110 sends feedback information respecting these requests and data accesses to the monitoring server 130. The monitoring server 130 then summarizes and classifies this feedback information into multiple demographic profiles, and stores these profiles in the data store 140.

In another of these processes, while a user's local device 100 is connected to the web server 150, the monitoring server 130 determines which targeted data needs to be sent to the client monitoring application 110 and then transmits this targeted data to the client monitoring application 110. The monitoring server 130 accomplishes this by:

examining the scheduling requirements to determine which data needs to be sent;

examining the demographic requirements of the data to determine to which demographic profiles the data needs to be sent;

selecting the users who are currently connected that meet the demographic requirements of the data; and sending the data to the selected users.

As mentioned, one of the processes relates to the user's use of his browser application 160. The methods of monitoring the user's browsing is described next.

In the first step of the method, the client monitoring application 110 is activated on the local device 100 (step 510). The client monitoring application 110 may be installed during manufacture of the local device 100, during use of the local device 100 at the instigation of the user, or may occur automatically as a consequence of other processes. Although at least some aspects of the client monitoring application 110 should be operable from the local device 100, the client monitoring application 100 need not be stored on the local device 100 and can be run from a remote location.

In the next step of the method, the browser application 160 is activated on the local device 100 (step 515). The browser application 160 may be activated manually, or automatically by a script or through commands issued by the client monitoring application 110. It should be appreciated that the browser application 160 may be activated prior to activation of the client monitoring application 110, though in such a case, the functionality of the client monitoring application 110 will not be available as described below with respect to grabbing URLs from the address bar 220.

Figure 6:
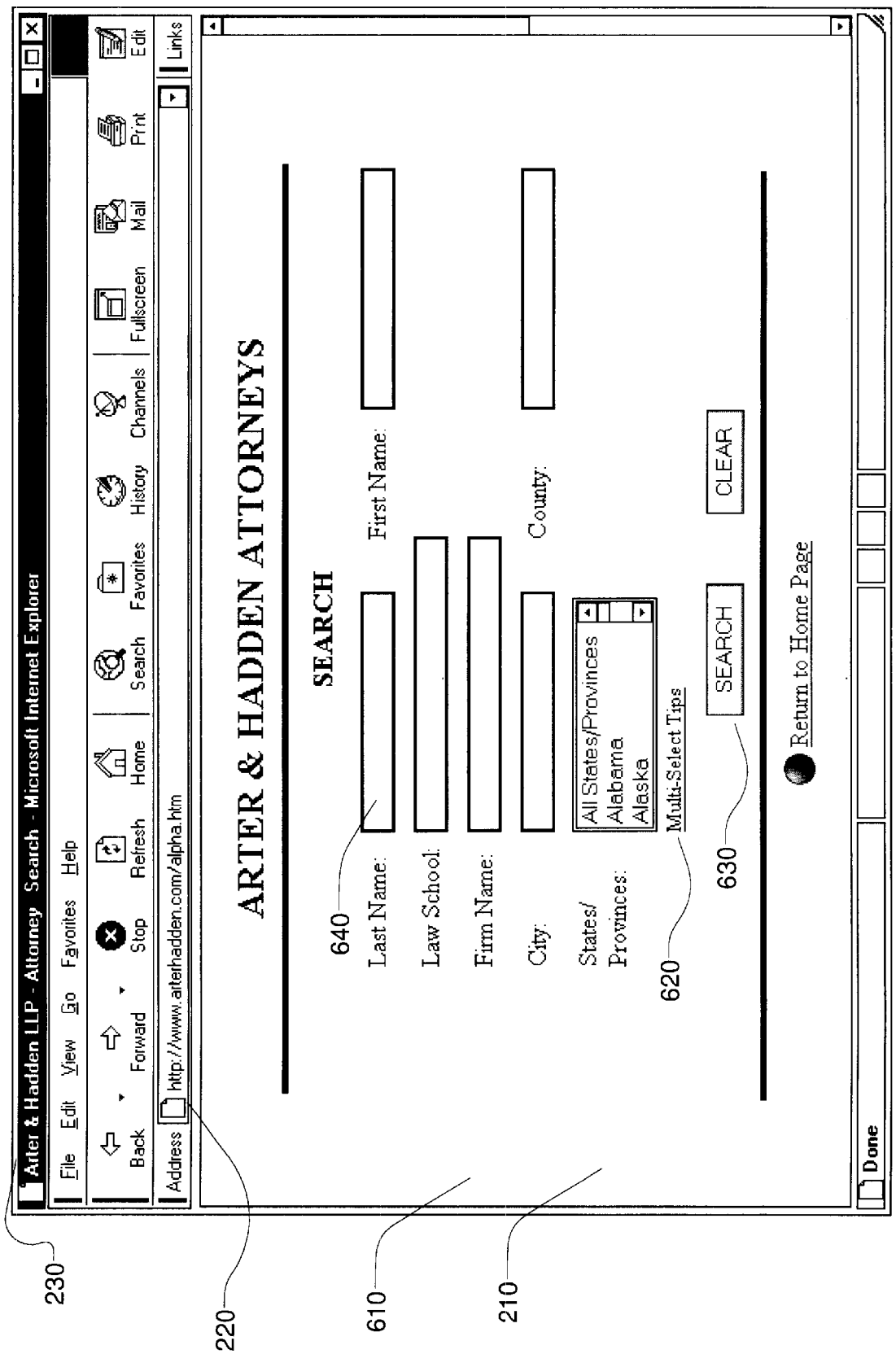
FIG. 6 is a screen shot of a second window displayed by a browser application.

In the next step, the user requests that the browser application 160 display a desired web page (step 520). This may occur in at least three different ways, which are discussed with reference to FIG. 6. FIG. 6 shows the browser window 200 with a web page 610. The address bar 220 displays the URL for the displayed web page 610, www.arterhadden.com/alpha.htm. The displayed web page 610 includes a number of common features to web pages. These features are hyperlinks such as hyperlink 620, buttons such as button 630, and data entry fields such as data entry field 640. Those of ordinary skill in the art appreciate the design of web pages and the functionality of hyperlinks, buttons and data entry fields, so these features are not described further herein.

One way for the user to request that the browser application display a desired web page is to enter a URL into the address bar 220. For example, to display the web page 610, the user could use the keyboard 102 to type the URL www.arterhadden.com/alpha.htm into the address bar 220. Alternatively, the user could paste the URL into the address bar 220, or use automated means such a script.

A second way for the user to request that the browser application 160 display a desired web page is to activate a hyperlink displayed on the currently displayed page. For example, to go to the home page on the Arter & Hadden LLP web site, the user could use the pointing device 103 to activate (e.g., click with his mouse on) the hyperlink 620.

A third way for the user to request that the browser application 160 display a desired web page is through entry of a keyword into a data entry field in a web page displayed in the display pane 210. For example, to search for an attorney with the firm of Arter & Hadden LLP, the user could use the keyboard 102 to type the attorney's last name into the data entry field 640 and click on the Search button 630. It is well known that some data entry fields may be activated by simply typing keywords into the data entry field and typing Enter, and this is also within the scope of the invention.

Other features that are used for the user to request a desired web page are within the scope of the invention, such as pull-down lists and scroll boxes. It should also be appreciated that a displayed web page may be a static or a dynamic page.

Figure 5:
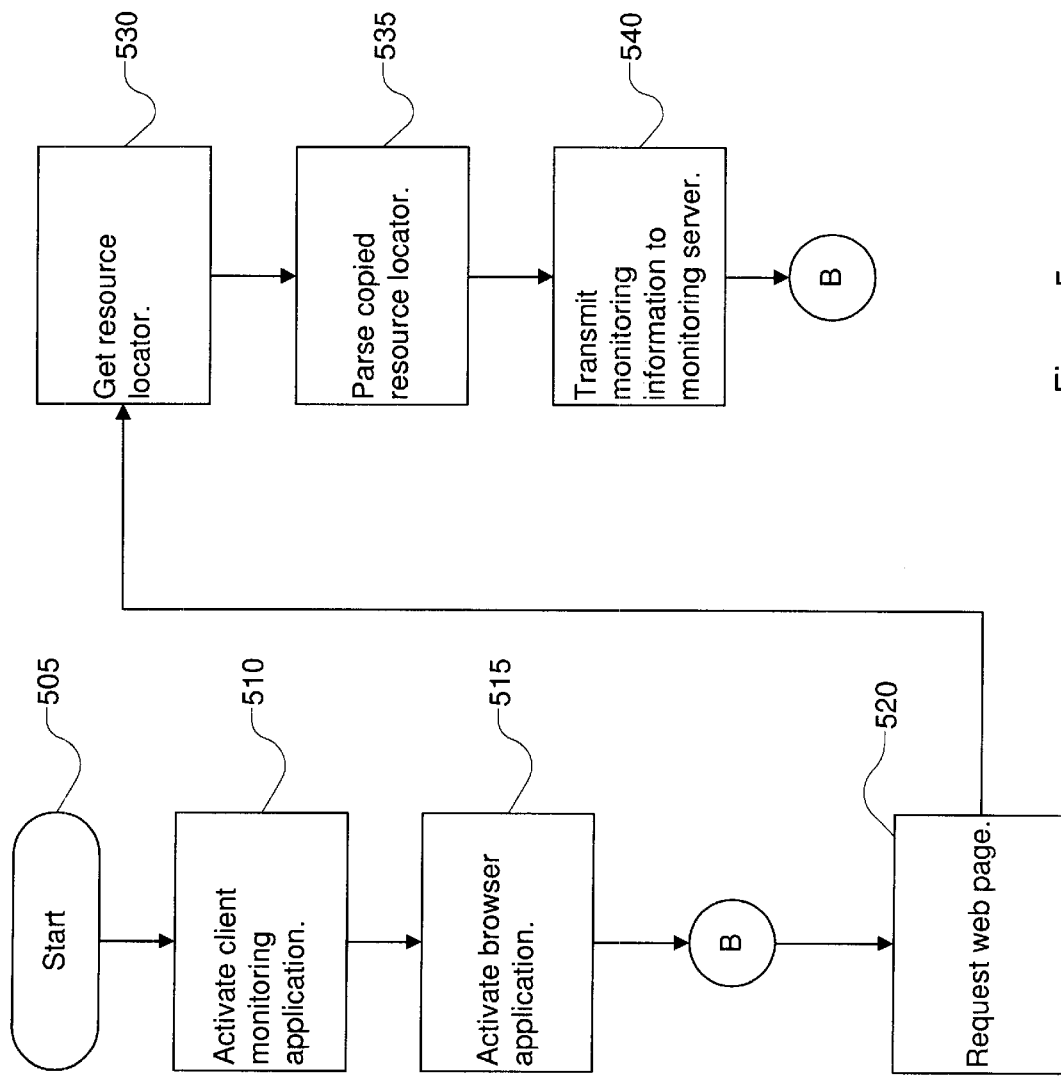
FIG. 5 is a flow chart of a method of monitoring web browsing by a user in accordance with the invention.

Returning now to the method of FIG. 5, in the next step, the monitoring application 110 obtains identifying information about the requested web page (step 530). As mentioned above, there are at least three techniques for obtaining information about a requested web page, and these techniques are further described with respect to FIGS. 8A, 8B and 8C, respectively. There are at least three ways in which the client monitoring application 110 can obtain information about the user's use of his browser: (1) by monitoring URLs in the address bar of the browser application 160, (2) by monitoring the stream of URLs transmitted by the browser application 160 to the data access network 120, and (3) by grabbing information from the browser application's display pane 210. Each of these three techniques is described below in turn.

According to the first technique, the client monitoring application 110 grabs URLs from the address bar. In this technique, after the user requests that the browser application 160 display a desired web page (step 520), the browser application 160 inserts in the address bar the URL corresponding to the web page desired by the user (step 810). This is a normal part of the operation of browser applications such as Microsoft Internet Explorer and Netscape Navigator.

Figure 7:
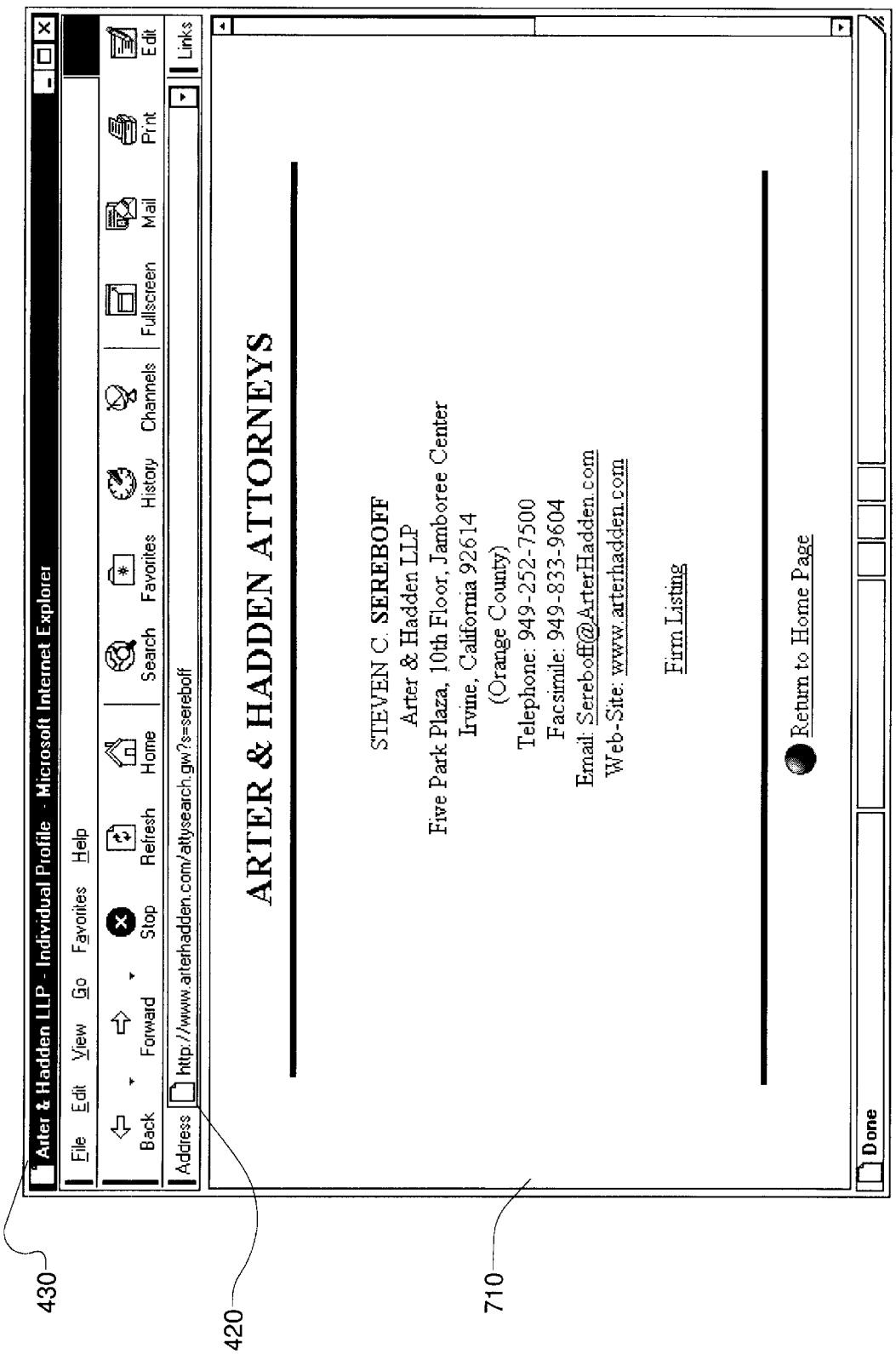
FIG. 7 is a screen shot of a third window displayed by a browser application.

With respect to the example of FIG. 6, if the keyword "sereboff" is entered into the data entry field 640, and the user clicks on the Search button 630, the browser application will display a new web page in the display pane 210, such as web page 710 shown in FIG. 7. In both Microsoft Internet Explorer and Netscape Navigator, the browser application inserts the new URL in the address bar before actually displaying the page identified by the URL. As can be seen in FIG. 7, the browser application has inserted the URL of the displayed web page 710 in the address bar 220. FIG. 7 also shows a new title in the title bar 230—that of the currently displayed page. Whereas the web page of FIG. 6 is entitled, "Arter & Hadden LLP—Attorney Search" and has the URL www.arterhadden.com/alpha.htm, the web page of FIG. 7 is entitled, "Arter & Hadden LLP—Individual Profile" and has the URL www.arterhadden.com/attysearch.gw?s=sereboff.

After the URL has been inserted into the address bar (step 810), the client monitoring application 110 obtains the URL from the address bar (step 820). In the preferred embodiment, the client monitoring application monitors the title bar 230. This can be done by setting an appropriate hook, in the manner known in the art. The client monitoring application recognizes if the title has changed, and if so, obtains the new URL from the address bar. Other techniques for recognizing that the URL in the address bar have changed are within the scope of the invention.

According to the second technique for obtaining information about a requested web page, the client monitoring application 110 grabs URLs from the communications stream between the browser application 160 and the web server 150. In this technique, after the user requests that the browser application 160 display a desired web page (step 520), the browser application 160 transmits the URL of the desired web page to the web server 150 (step 830). The URL will be available within the local device 100 at a number of software and hardware levels, and the client monitoring application 110 can set hooks or create traps at any of these levels as may be desired. After the URL is transmitted from the browser application 160 (step 830), the client monitoring application 110 obtains the URL from the transmission (step 840).

According to the third technique for obtaining information about a requested web page, the client monitoring application 110 grabs information from the browser application's display pane 210, or the object corresponding to the display pane 210. In this technique, after the user requests that the browser application 160 display a desired web page (step 520), client monitoring application 110 determines if the displayed page (e.g., page 610) includes a data entry field (step 850). If not, then the client monitoring application 110 has nothing to do (step 860). However, if the displayed web page has a data entry field, then the client monitoring application 110 determines if the user has entered anything in the data entry field (step 870). If the user has not entered anything into the data entry field, then the client monitoring application 110 has nothing to do (step 860). However, if the user has entered keywords into the data entry field, then the client monitoring application 110 copies these keywords (step 880). There are a number of ways to test if a web page has a data entry field, and to copy entered keywords. These include screen scraping, parsing web pages received by the local device 100, copying keystrokes, etc. If the user selects a hyperlink, the client monitoring application 110 can obtain the URL associated with the hyperlink from the HTML source of the displayed page having the hyperlink.

After the client monitoring application 110 obtains the information about the requested web page (step 530), the client monitoring application 110 parses the copied information, and derives monitoring information from the copied information (step 535). As described above, the client monitoring application 110 will have grabbed a URL, keywords, or other information. The particular nature of the monitoring information is not critical to the present invention. However, in the preferred embodiment, the monitoring information is used for targeting advertising to the user. Thus, useful information which is desirable for monitoring includes the top level domain name and the second level domain name. Other useful information are keywords entered by the user into data entry fields.

For some URLs, such as search engines, the keywords are particularly useful. The client monitoring application 110 preferably recognizes when the user is browsing a search engine, and in such a case grabs the search terms (keywords) entered by the user in the search engine's search box (data entry field). The client monitoring application 110 preferably can recognize the major search engines from their second level domain names, e.g. "yahoo," "excite," "altavista," "lycos," "infoseek" and "go."

In some embodiments, it might be desirable for the client monitoring application 110 to transmit the entire URL to the monitoring server 130.

With the monitoring information derived (step 535), the client monitoring application 110 next transmits the monitoring information to the monitoring server 130 (step 540). In some embodiments, the monitoring information should be transmitted in a coded or secure format. Furthermore, in some embodiments, the monitoring information should be transmitted in a batch form. The process then loops back to step 520 and continues until the client monitoring application 110 or the browser application 160 is de-activated (e.g., closed).

As can be seen, this process permits browsing by the user, and monitoring of that browsing, without interfering with the user's use of the browser application.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of monitoring web browsing by a user, wherein the user browses by means of a browser application on a client computer, the client computer comprising a display and an input device, the browser application for generating a browser window on the display and for requesting web pages, the browser window including a display pane and an address bar, the display pane comprising a first region of the browser window wherein the browser application causes web pages obtained by the browser application to be displayed, the address bar comprising a second region of the browser window through which the browser application displays resource locator strings corresponding to displayed web pages, the method comprising the steps of:

(a) activating a client monitoring application on the client computer;

(b) the browser application activating on the client computer;

(c) the user using the input device and the browser application to request a first web page desired by the user from a web server;

(d) the browser application displaying a first resource locator string corresponding to the first web page in the address bar;

(e) the client monitoring application obtaining the first resource locator string from the address bar; and (f) the client monitoring application transmitting monitoring information derived from the first resource locator string to a monitoring server;

whereby browsing by the user is monitored without interfering with the user's use of the browser application.

2. The method of monitoring web browsing by a user as set forth in claim 1, wherein the input device comprises a keyboard, and the method further comprises, in the step of the user using the input device and the browser application to request the first web page, the user using the keyboard to enter the first resource locator string into the address bar.

3. The method of monitoring web browsing by a user as set forth in claim 1, wherein the input device comprises a pointing device, and the method further comprises:

after the step of the browser application activating on the client computer, the browser application displaying a second web page in the display pane, the display pane including a hyperlink, wherein the hyperlink is associated with the first resource locator string; and in the step of the user using the input device and the browser application to request the first web page, the user using the pointing device to click on the hyperlink;

wherein the browser application displays the first resource locator string in the address bar in response to the user using the mouse to click on the hyperlink.

4. The method of monitoring web browsing by a user as set forth in claim 1, the method further comprising:

after the step of the browser application activating on the client computer, the browser application displaying a second web page in the display pane, the display pane including a data entry field; and in the step of the user using the input device and the browser application to request the first web page, the user using the input device to enter a keyword into the data entry field;

whereby the first resource locator string includes the keyword.

5. The method of monitoring web browsing by a user as set forth in claim 1, wherein the web server is part of the Internet.

6. The method of monitoring web browsing by a user as set forth in claim 1, wherein the first resource locator string comprises a top level domain name and a second level domain name, and wherein the monitoring information comprises the top level domain name and the second level domain name.

7. The method of monitoring web browsing by a user as set forth in claim 1, wherein the web server is part of an intranet.

8. A method of monitoring web browsing by a user, wherein the user browses by means of a browser application on a client computer, the client computer comprising a display and an input device, the browser application for generating a browser window on the display, the browser window including a display pane, the browser application further for requesting web pages and displaying web pages in the display pane, wherein the user causes the browser application to request web pages through use of the input device, the method comprising the steps of:

(a) activating a client monitoring application on the client computer;

(b) the browser application activating on the client computer;

(c) the user using the input device to identify to the browser application a desired first web page;

(d) the browser application transmitting a first resource locator string corresponding to the desired first web page to a first web server;

(e) the client monitoring application obtaining the first resource locator string from the transmission by the browser application of the first resource locator string to the first web server; and (f) the client monitoring application transmitting monitoring information derived from the copied first resource locator string to a monitoring server;

whereby browsing by the user is monitored without interfering with the user's use of the browser application.

9. The method of monitoring web browsing by a user as set forth in claim 8, wherein the browser window further includes an address bar, the address bar comprising a second region of the browser window through which the browser application receives resource locator strings entered by the user, and the resource locator strings entered by the user correspond to web pages which the user desires to be displayed in the display pane;

the method further comprising, in the step of the user using the input device to identify to the browser application the desired first web page, the user entering the first resource locator string into the address bar.

10. The method of monitoring web browsing by a user as set forth in claim 8, wherein the input device comprises a pointing device, and the method further comprises, after the step of the browser application activating on the client computer, the browser application displaying a second web page in the display pane, the display pane including a hyperlink, wherein the hyperlink is associated with the first resource locator string; and in the step of the user using the input device and the browser application to request the first web page, the user using the pointing device to click on the hyperlink;

wherein the browser application displays the first resource locator string in the address bar in response to the user using the mouse to click on the hyperlink.

11. The method of monitoring web browsing by a user as set forth in claim 8, the method further comprising:

(a) after the step of the browser application activating on the client computer, the browser application displaying a second web page, wherein the second web page includes a data entry field;

(b) in the step of the user using the input device to identify to the browser application the desired first web page, the user using the input device to enter a keyword into the data entry field;

(c) in the step of the browser application transmitting the first string to the web server, the first resource locator string including the keyword;

(d) in the step of the client monitoring application transmitting the monitoring information, the monitoring information identifying the keyword.

12. The method of monitoring web browsing by a user as set forth in claim 11, after the step of the client monitoring application obtaining the first resource locator string, the client monitoring application testing whether the first resource locator string includes a predefined second string;

if the first resource locator string includes the predefined second string, then the client monitoring application parsing the first resource locator string and deriving the keyword from the first resource locator string, and otherwise omitting the step of the identifier identifying the keyword.

13. The method of monitoring web browsing by a user as set forth in claim 8, wherein the source of web pages comprises the Internet.

14. The method of monitoring web browsing by a user as set forth in claim 8, wherein the first resource locator string comprises a top level domain name and a second level domain name, and wherein the monitoring information transmitted by the client monitoring application comprises the top level domain name and the second level domain name.

15. The method of monitoring web browsing by a user as set forth in claim 8, wherein the source of web pages comprises an intranet.

16. A method of monitoring web browsing by a user, wherein the user browses by means of a browser application on a client computer, the client computer comprising a display and an input device, the browser application for generating a browser window on the display, the browser window including a display pane, the browser application further for requesting web pages and displaying web pages in the display pane, wherein the user causes the browser application to request web pages through use of the input device, the method comprising the steps of:

(a) activating a client monitoring application on the client computer;

(b) the browser application activating on the client computer;

(c) the browser application receiving a first web page from a first web server, the first web page comprising a data entry field;

(d) the browser application displaying the first web page in the display pane;

(e) the user using the input device to enter a keyword into the data entry field;

(f) the client monitoring application obtaining the keyword from the displayed first web page; and (g) the client monitoring application transmitting an identifier of the keyword to a predetermined server;

whereby browsing by the user is monitored without interfering with the user's use of the browser application.

17. The method of monitoring web browsing by a user as set forth in claim 16, wherein the identifier comprises the keyword.

18. The method of monitoring web browsing by a user as set forth in claim 16, wherein the first web page has associated therewith a first resource locator string, the method further including the steps of:

the client monitoring application testing whether the first resource locator string includes a predefined second string;

if the first resource locator string includes the predefined second string, then performing the step of the client monitoring application obtaining the keyword from the displayed first web page, and otherwise omitting the steps of the client monitoring application obtaining the keyword and transmitting the identifier of the keyword.

19. The method of monitoring web browsing by a user as set forth in claim 18, wherein the first web server includes a search engine and the predefined second string identifies the search engine.

20. The method of monitoring web browsing by a user as set forth in claim 19, wherein the predefined second string is selected from the group consisting of: "yahoo," "excite," "altavista," "lycos," "infoseek" and "go."

21. A method of monitoring a user's usage of the Internet using a client monitoring application on a local device, the local device including an input device and an output device, the local device accessing the Internet and providing interaction with the Internet using a browser application operative on the local device, the browser application for generating a browser window on the output device and for requesting web pages, the browser window including a display pane and an address bar, the display pane comprising a first region of the browser window wherein the browser application causes web pages obtained by the browser application to be displayed, the address bar comprising a second region of the browser window through which the browser application displays resource locator strings corresponding to displayed web pages in the display pane, the method comprising the steps of:

(a) the user causing the local device to connect to a web server;

(b) the client monitoring application establishing a communication link to a monitoring server;

(c) the client monitoring application transmitting identifying information to the monitoring server;

(d) the user identifying to the browser application a first web page to be retrieved, wherein a first resource locator string is associated with the first web page;

(e) the client monitoring application obtaining the first resource locator string from the address bar;

(f) the client monitoring application deriving monitoring information from the copy of the resource locator string; and (g) the client monitoring application transmitting the monitoring information to the monitoring server.

22. The method of monitoring a user's usage of the Internet using a client monitoring application on a local device of claim 21, wherein the first resource locator string includes a second level domain name and the monitoring information includes the second level domain name.

23. The method of monitoring a user's usage of the Internet using a client monitoring application on a local device of claim 21, wherein the client monitoring application transmits the monitoring information to the monitoring server in a coded format.

24. A method of monitoring a user's usage of the Internet using a client monitoring application on a local device, the local device including an input device and an output device, the local device accessing the Internet and providing interaction with the Internet using a browser application operative on the local device, the method comprising the steps of:

(a) the user causing the local device to connect to a first web server;

(b) the client monitoring application establishing a communication link to a monitoring server;

(c) the client monitoring application transmitting identifying information to the monitoring server;

(d) the user using the input device, the output device and the browser application to interact with the first web server, wherein the browser application transmits resource locator strings to the first web server to request specific data from the first web server;

(e) concurrently with the user interacting with the first web server, the client monitoring application monitoring the resource locator strings transmitted to the first web server;

(f) the client monitoring application deriving monitoring information from each such resource locator string; and (g) the client monitoring application transmitting the monitoring information to the monitoring server.

25. The method of monitoring a user's usage of the Internet using a client monitoring application on a local device of claim 24, wherein the resource locator string includes a second level domain name and the monitoring information includes the second level domain name.

26. The method of monitoring a user's usage of the Internet using a client monitoring application on a local device of claim 24, wherein the client monitoring application transmits the monitoring information to the monitoring server in a coded format.

27. A method of monitoring a user's usage of the Internet using a client application on a local device, the local device including an input device and an output device, the local device accessing the Internet and providing interaction with the Internet using a browser application operative on the local device, the method comprising the steps of:

(a) the user causing the local device to connect to a first web server;

(b) the client monitoring application establishing a communication link to a monitoring server;

(c) the client monitoring application transmitting identifying information to the monitoring server;

(d) the browser application displaying a first web page in the display pane, the first web page comprising a data entry field;

(e) the user using the input device to enter a keyword into the data entry field;

(f) the browser application transmitting a first resource locator string to the first web server, wherein the first resource locator string includes the keyword;

(g) the client monitoring application obtaining the first resource locator string from the transmission by the browser application of the first resource locator string to the first web server;

(h) the client monitoring application testing whether the first resource locator includes a predefined second string; and (i) if the first resource locator string includes the predefined second string, then:
(1) the client monitoring application parsing the first resource locator string and deriving the keyword from the first resource locator string; and
(2) the client monitoring application transmitting monitoring information to the monitoring server, the monitoring information comprising at least a part of the first resource locator string.

28. The method of monitoring a user's usage of the Internet using a client monitoring application on a local device of claim 27, wherein the first resource locator string includes a second level domain name and the monitoring information includes the second level domain name.

29. The method of monitoring a user's usage of the Internet using a client monitoring application on a local device of claim 27, wherein the client monitoring application transmits the monitoring information to the monitoring server in a coded format.

30. The method of monitoring a user's usage of the Internet using a client monitoring application on a local device of claim 27, wherein the web server includes a search engine and the predefined second string identifies the search engine.

31. The method of monitoring a user's usage of the Internet using a client monitoring application on a local device of claim 30, wherein the second string includes a second level domain name selected from the group consisting of: "yahoo," "excited" altavista," "lycos," "infoseek" and "go."

32. A method of monitoring web browsing by a user, wherein the user browses by means of a browser application on a client computer, the client computer comprising a display and an input device, the browser application for generating a browser window on the display and for requesting web pages, the browser window including a display pane and an address bar, the display pane comprising a first region of the browser window wherein the browser application causes web pages obtained by the browser application to be displayed, the address bar comprising a data object in which a resource locator string corresponding to a displayed web page is stored, the method comprising the steps of:

a client monitoring application activating on the client computer;

the browser application activating on the client computer;

the user using the input device and the browser application to request a first web page desired by the user from a web server;

storing a first resource locator string corresponding to the first web page in the address bar;

the client monitoring application obtaining the first resource locator string from the address bar;

the client monitoring application transmitting monitoring information derived from the first resource locator string to a monitoring server;

whereby browsing by the user is monitored without interfering with the user's use of the browser application.

33. The method of monitoring web browsing by a user as set forth in claim 32, wherein the input device comprises a keyboard, and the method further comprises, in the step of the user using the input device and the browser application to request the first web page, the user using the keyboard to enter the first resource locator string into a second region of the browser window corresponding to the address bar.

34. The method of monitoring web browsing by a user as set forth in claim 32, wherein the input device comprises a pointing device, and the method further comprises:

after the step of the browser application activating on the client computer, the browser application displaying a second web page in the display pane, the display pane including a hyperlink, wherein the hyperlink is associated with the first resource locator string; and in the step of the user using the input device and the browser application to request the first web page, the user using the pointing device to click on the hyperlink;

wherein the first resource locator string is stored in the address bar in response to the user using the mouse to click on the hyperlink.

35. The method of monitoring web browsing by a user as set forth in claim 32, the method further comprising:

after the step of the browser application activating on the client computer, the browser application displaying a second web page in the display pane, the display pane including a data entry field;

in the step of the user using the input device and the browser application to request the first web page, the user using the input device to enter a keyword into the data entry field;

whereby the first resource locator string includes the keyword.

36. The method of monitoring web browsing by a user as set forth in claim 32, wherein the web server is part of the Internet.

37. The method of monitoring web browsing by a user as set forth in claim 32, wherein the first resource locator string comprises a top level domain name and a second level domain name, and wherein the monitoring information comprises the top level domain name and the second level domain name.

38. The method of monitoring web browsing by a user as set forth in claim 32, wherein the web server is part of an intranet.

39. A method of monitoring a user's usage of the Internet using a client monitoring application on a local device, the local device including an input device and an output device, the local device accessing the Internet and providing interaction with the Internet using a browser application operative on the local device, the browser application for generating a browser window on the output device and for requesting web pages, the browser window including a display pane and an address bar, the display pane comprising a first region of the browser window wherein the browser application causes web pages obtained by the browser application to be displayed, the address bar comprising a data object in which a resource locator string corresponding to a displayed web page is stored, the method comprising the steps of:

the local device connecting to a web server;

the client monitoring application establishing a communication link to a monitoring server;

the client monitoring application transmitting identifying information to the monitoring server;

the user identifying to the browser application a first web page to be retrieved, wherein a first resource locator string is associated with the first web page;

the client monitoring application obtaining the first resource locator string from the address bar;

the client monitoring application deriving monitoring information from the copy of the resource locator string;

the client monitoring application transmitting the monitoring information to the monitoring server.

40. The method of monitoring a user's usage of the Internet using a client monitoring application on a local device of claim 39, wherein the first resource locator string includes a second level domain name and the monitoring information includes the second level domain name.

41. The method of monitoring a user's usage of the Internet using a client monitoring application on a local device of claim 39, wherein the client monitoring application transmits the monitoring information to the monitoring server in a coded format.

* * * * *